Figure 1:
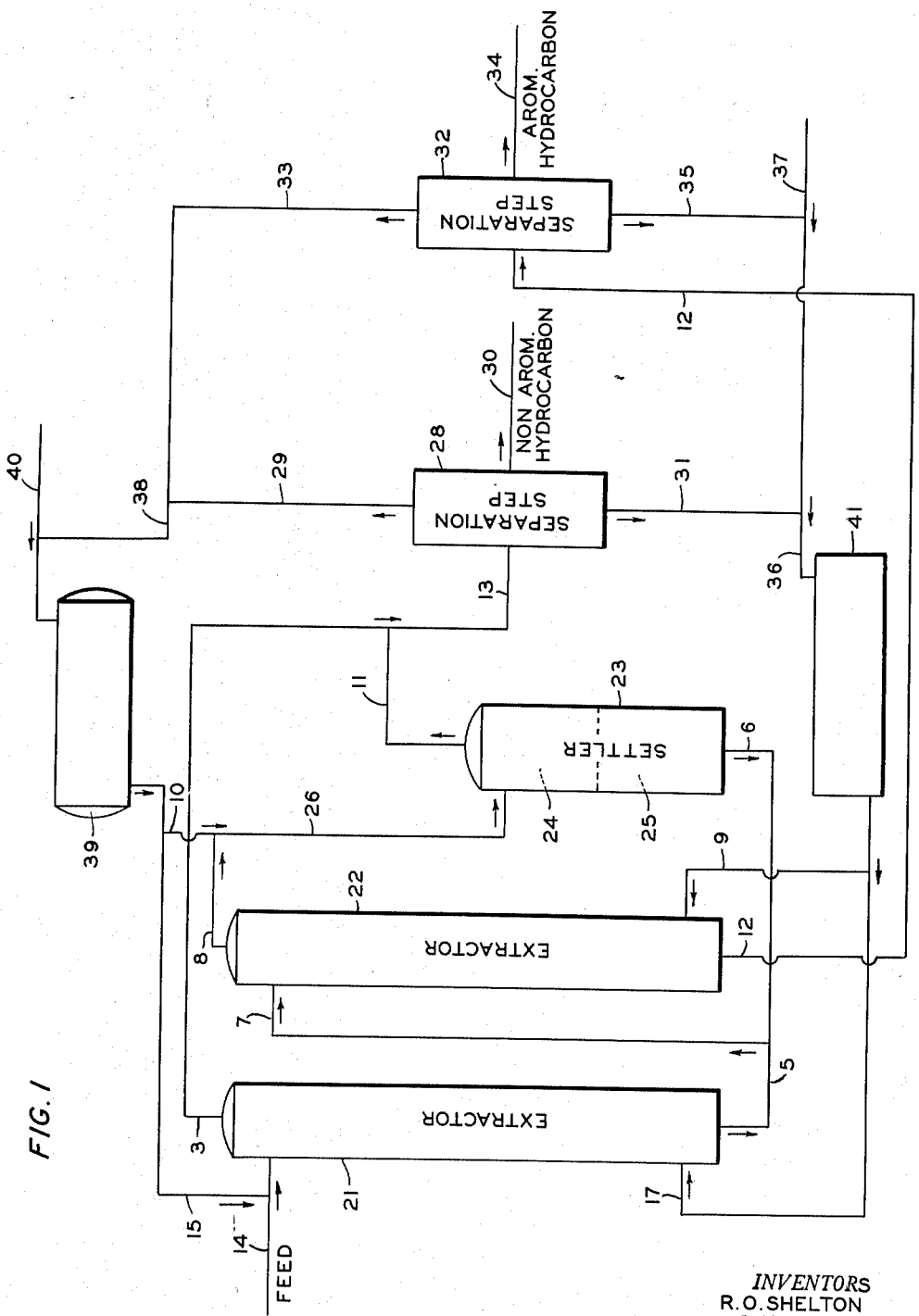

Nov. 22, 1955 R. O. SHELTON ET AL 2,724,682
SULFUR DIOXIDE EXTRACTION PROCESS
Filed Dec. 21, 1951 2 Sheets-Sheet 2

INVENTORS
R. O. SHELTON
G. H. DALE
BY
ATTORNEYS

United States Patent Office 2,724,682
Patented Nov. 22, 1955

2,724,682

SULFUR DIOXIDE EXTRACTION PROCESS

Russell O. Shelton and Glenn H. Dale, Bartlesville, Okla., assignors to Phillips Petroleum Company, a corporation of Delaware Application December 21, 1951, Serial No. 262,754

20 Claims. (Cl. 196—14.19)

This invention relates to solvent extraction. In one aspect it relates to a method for operating a sulfur dioxide solvent extraction system. In another aspect it relates to a method for the separation and recovery of aromatic hydrocarbons from hydrocarbon streams using sulfur dioxide as a solvent in which extractions may be made at temperatures above the conventional refrigeration temperatures heretofore used in systems utilizing sulfur dioxide as a solvent.

Sulfur dioxide is considered in the art an excellent solvent for extraction of aromatic hydrocarbons from mixtures of aromatic and other hydrocarbons. When solvent extracting a high aromatic content feed stock, it is necessary to carry out the extraction operations at relatively low temperatures because of the miscibility of aromatic hydrocarbons with sulfur dioxide. For example, benzene and toluene are soluble in all proportions in sulfur dioxide at atmospheric temperatures. The following tabulation illustrates the miscibility of mixtures of toluene and normal heptane with liquid sulfur dioxide. In this tabulation the toluene content is given in terms of weight per cent with the remainder of the composition being normal heptane. The temperature in degrees Fahrenheit given in the temperature column is the temperature above which only one phase exists for the mixture indicated.

| Weight Per Cent of Toluene | Temperature of Complete Miscibility, °F. |
|---|---|
| 82 | −25 |
| 63 | 6 |
| 43 | 34 |

From this tabulation it may be seen that as the toluene concentration increases it is necessary to solvent extract the toluene-heptane mixture at lower temperatures in order to obtain a phase separation and obviously it is necessary to obtain phase separation in a solvent extraction operation in order to effect a separation. It is impractical to operate immediately below the temperature of complete miscibility; hence, it is preferred to operate at some temperature well below this temperature. Thus, when operating our solvent extraction system it is preferred to operate, for example, at least 10° to 15° F. below the temperature of complete miscibility in order to obtain sufficient difference in specific gravities of the two phases so that phase separation will be sufficiently rapid for commercial operation, and also so that there will be a desirable degree of selectivity for one hydrocarbon by the solvent over the other hydrocarbon or hydrocarbons. Likewise, plant temperature fluctuations should always be on the 2-phase side of the temperature of complete miscibility.

According to our invention we use a paraffinic or naphthenic stripping oil having a boiling point higher than the boiling point of any of the hydrocarbons being separated, to alter the solubility relationships between aromatic hydrocarbons and the liquid sulfur dioxide, in a novel extraction system which provides for an optimum ratio of sulfur dioxide to stripping oil in each step. Thus, when using some stripping oil in conjunction with sulfur dioxide in the first step of our novel process, we are able to operate this step at appreciably higher temperatures than could be employed in the absence of our stripping oil. Since sulfur dioxide extraction temperatures, when extracting aromatic hydrocarbons, are considerably below normal atmospheric temperatures, that is of the order of 0 to 25° F., considerable refrigeration is required. When using our stripping oil to modify the solubility relationship between the aromatic hydrocarbons and the liquid sulfur dioxide we are able to carry out this first extraction operation at temperatures considerably higher than the aforesaid 0 to 25° F., thereby saving materially on refrigeration costs. We combine this first extraction step with a second step in which a substantially higher ratio of stripping oil to sulfur dioxide is employed, whereby we obtain an aromatic extract of greatly increased purity, as will be more fully described hereinafter.

An object of our invention is to provide a method for the separation and recovery of aromatic hydrocarbons from aromatic hydrocarbon containing feed stocks.

Another object of our invention is to provide a process for the improvement of the purity of aromatic hydrocarbon extracts, as regards the aromatic hydrocarbon content.

Still another object of our invention is to provide a process for the separation and recovery of aromatic hydrocarbons from aromatic hydrocarbon containing refinery streams.

Still another object of our invention is to provide a process for the extraction and recovery of aromatic hydrocarbons from cracked gasolines.

Yet another object of our invention is to provide such a process which is capable of yielding an aromatic hydrocarbon product of a high degree of purity and at a relatively low cost.

Still other objects and advantages of our invention will be realized upon reading the following description, which taken with the attached drawing forms a part of this specification.

As mentioned hereinbefore, our invention consists in the use of a paraffinic or naphthenic hydrocarbon type (saturated hydrocarbon) of stripping oil in conjunction with liquid sulfur dioxide as a selective solvent for the extraction and recovery of aromatic hydrocarbons. One of the points of importance of our invention is the control of the ratio of the liquid sulfur dioxide to the stripping oil in the various process stages. By means of our invention, in comparison with conventional sulfur dioxide extraction processes, we are able to operate an extraction system at a temperature requiring the use of less refrigeration and less stripping oil with about the same yield and over-all recovery of aromatic hydrocarbon or, when operating at conventional low temperatures, we obtain markedly increased yields of aromatic hydrocarbons of increased purity.

The stripping oil useful in our process may be a straight run hydrocarbon oil, as for example a low viscosity lubricating oil fraction, or it may be a kerosene or gas-oil. The oil may contain both paraffinic and naphthenic hydrocarbons or may be completely paraffinic or naphthenic in nature. Naphthenic hydrocarbons are cycloparaffinic hydrocarbons, and accordingly the generic term paraffinic hydrocarbon as applied to the stripping oil and used in this specification and claims is intended to include straight chain paraffinic, isoparaffinic and/or naphthenic type hydrocarbon oils.

Sufficient pressure is maintained in the extractors and settler to make certain that liquid phase conditions exist therein.

The lower temperature limits at which our system may be operated are defined at least in part by the solidification or freezing point of hydrocarbon constituents in the stripping oil. The stripping oil also should possess an initial boiling point somewhat higher than the end boiling point of any of the hydrocarbons being treated, since if there is an overlapping of boiling points, feed stock hydrocarbons may accumulate in the stripping oil or stripping oil hydrocarbons may be removed from the system in one of the hydrocarbon products. The distillation end point of the stripping oil is not particularly critical, but when this temperature is too high, freezing points of high boiling constituents may disadvantageously limit desirably low operating temperatures. The paraffinic oil used in the example given hereinbelow is a vacuum distillate oil having a viscosity somewhat less than that of an SAE 10 motor oil. The oil has an initial boiling point of about 600° F. We find that an oil of this type is very satisfactory as a stripping oil in carrying out the objects of our invention. Upper temperatures useful in the practice of our invention may be in the vicinity of 90 to 100° F. although still higher temperatures could be used provided the system pressures were increased sufficiently to maintain liquid phase conditions in the extraction vessels and connecting pipes and the like. However, when operating at high temperatures proportionately more stripping oil has to be used because of the increased miscibility of the feed stock hydrocarbons in liquid sulfur dioxide. In general, it is preferable to operate our system within a temperature range of about 0 to 70° F. Within this temperature range, excessive proportions of stripping oil are not needed. While, as mentioned hereinbefore, lower temperatures used are limited by the freezing point of the stripping oil and higher temperatures may be used as limited by the miscibility relations and operating pressure. By the term "freezing point of the stripping oil" we mean the temperature at which the first hydrocarbon crystallizes upon gradual cooling of the stripping oil.

Figure 2:
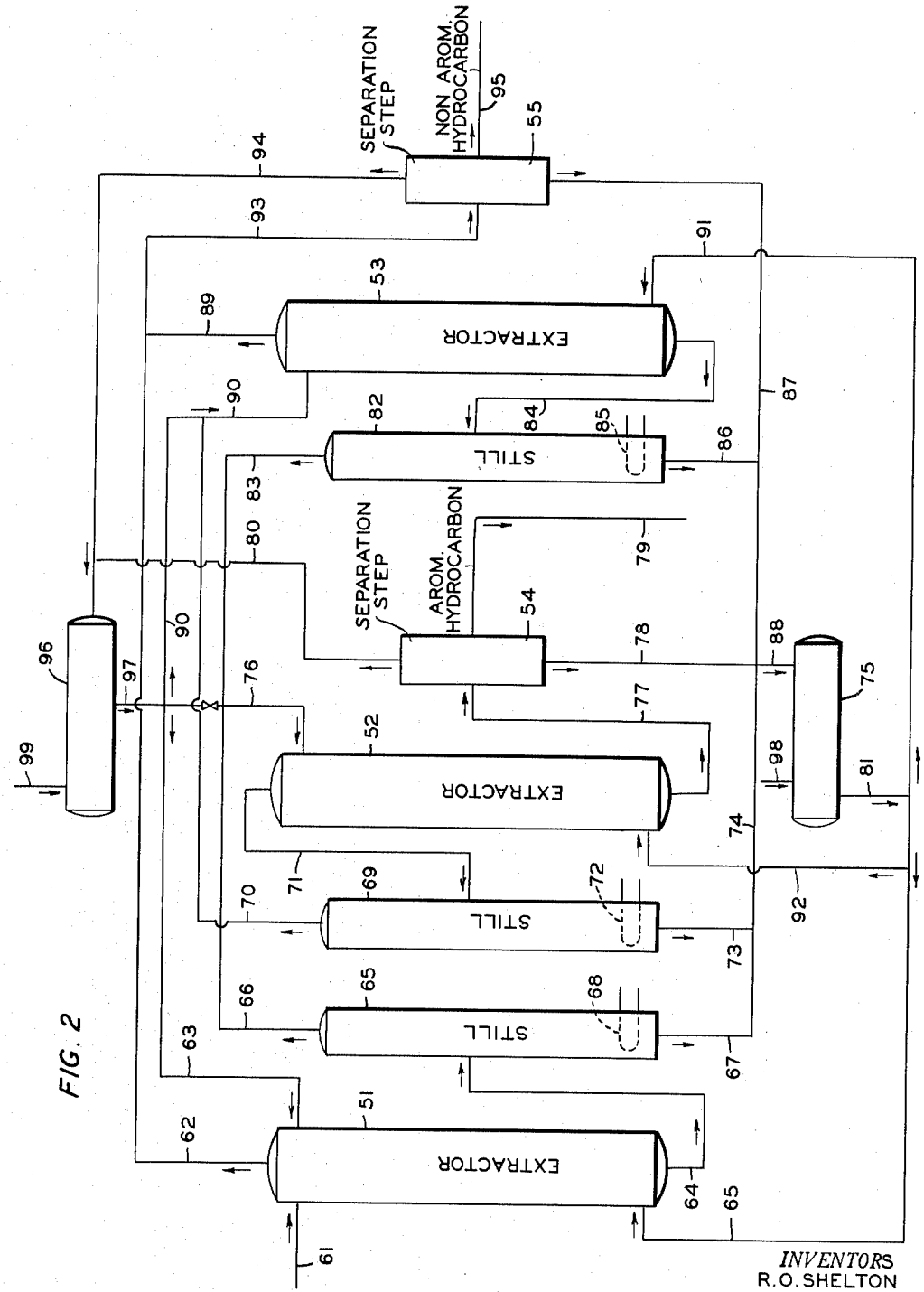

In the drawing, Figure 1 is an elevational view, in diagrammatic form, of one arrangement of apparatus useful in carrying out the process of our invention. Figure 2 is an elevational view in diagrammatic form of another arrangement of apparatus parts for carrying out the process of our invention.

Referring now to the drawing, and specifically to Figure 1, vessels 21 and 22 are columns suitable for liquid-liquid phase contacting under pressure. These vessels may be provided with any desirable type of liquid-liquid contacting apparatus to provide efficient liquid phase contacting. Vessel 23 is a settler. Elements 28 and 32 are identified on the drawing as being separation steps. Each of these elements may be one or more distillation towers or other type of separation equipment which would be suitable for separating sulfur dioxide, charge stock hydrocarbons and higher boiling hydrocarbons as separate products.

For simplicity and brevity purposes, valves, pumps, pressure and temperature indicating and recording apparatus, as well as controlling apparatus, are not shown in the drawing, nor discussed. The necessity for the use of such auxiliary apparatus, its installation and operation, are well known by those skilled in the art. The operation of the apparatus illustrated in Figure 1 will be described as applied to the separation of toluene from admixture with normal heptane. While we will describe the separation of toluene from normal heptane, that system is selected for illustrative purposes only and it should be realized that our process can be used for separating other aromatic hydrocarbons from other paraffinic hydrocarbons as well as admixtures of paraffinic with such other hydrocarbons as naphthenic, olefins and the like. Aromatic hydrocarbons or aromatic hydrocarbon concentrates can be separated from such aromatic hydrocarbon stocks as cracked gasoline, or the like.

A feed stock containing toluene and normal heptane is introduced into column 21 through line 14 from a source, not shown. Column 21 is previously filled with liquid sulfur dioxide. Liquid sulfur dioxide from a line 15 is added to the top of column 21 or is preferably mixed with the feed stock in line 14 prior to introduction of the feed stock into the column. Thus, this admixture of feed stock and liquid sulfur dioxide is introduced into the column at a point near its top. Liquid sulfur dioxide along with the soluble material from the feed flows downward in the vessel while the stripping oil which is introduced into the bottom portion of the vessel through a line 17 flows upward and countercurrently therewith. This stripping oil is intended to reduce the miscibility of the feed stock with the liquid sulfur dioxide to the extent that this step can be carried out at a temperature of about 30° F. A raffinate phase consisting mainly of non-aromatic feed constituents with some stripping oil and a very minor proportion of dissolved sulfur dioxide is removed through a raffinate withdrawal line 3. This material is admixed with a subsequently described material from a line 11 and the mixture passed on through a line 13 into the separation step 28.

The sulfur dioxide-rich phase containing the more aromatic constituents and the less paraffinic constituents of the feed stock along with some stripping oil, is removed from the bottom of the extractor through a line 5. This material is passed from line 5 on through a line 7 and is introduced into the top of the secondary extractor 22. In this secondary extractor this aforementioned extract phase, together with material from line 6, to be described subsequently, is considered the charge stock and additional stripping oil is introduced into the bottom through a line 9. This additional stripping oil flows upward and in countercurrent relation to the down flowing charge stock. In this extractor 22, the stripping oil operates substantially as an extraction solvent and as such, extracts from the down flowing charge stock the less aromatic constituents, along with some aromatic constituents, so that material which reaches the bottom of vessel 22 will be substantially free from non-aromatic hydrocarbons. Such material which in this operation is termed a secondary raffinate phase is removed from vessel 22 through a line 12 and is passed into the separation step 32 for separation and recovery of sulfur dioxide, aromatic hydrocarbons and stripping oil.

In this separation step 32, which may be one or more distillation columns or other separation means, the sulfur dioxide is intended to be removed through a line 33, the aromatic hydrocarbons through a line 34 and the stripping oil through a line 35. This stripping oil from line 35 passes on into a line 36. Stripping oil from the separation step 28 which is removed therefrom through line 31 is added to the stripping oil flowing through line 36 and the combined stream flows on into a stripping oil accumulator or run tank 41. From this run tank 41 the stripping oil is removed through line 17 and a portion passed through the line 9 as the stripping oil introduced into the extractor 22 while the remainder passes on through the line 17 as the stripping oil introduced into the column 21. The sulfur dioxide separated in the separation steps 28 and 32 is passed through lines 29 and 33, respectively, and combined in a line 38 and this combined sulfur dioxide stream is passed on into a run tank 39. Liquid sulfur dioxide from this tank 39 is removed therefrom through a line 15. A portion of the sulfur dioxide flowing through line 15 is passed through a line 10 to be admixed with the extract phase removed from column 22 through a line 8. This admixture of sulfur dioxide from line 10 and extract phase from line 8 passes through a line 26 and is introduced into the settler 23. In this settler 23, the added sulfur dioxide from line 10 in the presence of the stripping oil in the stream in line 8 causes a separation of phases. The heavier phase contains predominately sulfur dioxide with some little hydrocarbon and stripping oil and is identified in vessel 23 as phase 25. It is removed from this vessel through a line 6. This heavy phase flows through line 6 and is mixed with the first mentioned extract phase from line 5 and the admixture is passed on through line 7 into the secondary extractor 22.

The lighter phase, identified by reference numeral 24 in settler 23, is removed therefrom through the line 11 and is admixed with the first raffinate phase from line 3. This admixture flows on through line 13 into the separation step or zone 28 for separation into component parts. In this separation sulfur dioxide is intended to be removed through the line 29, hydrocarbon through line 30 and stripping oil through line 31. Since the separation step 28 operates on raffinate phase from extractor 21 and the less aromatic product from extractor 22, the hydrocarbon removed through line 30 is the non-aromatic hydrocarbon product of the process.

The material from line 12 which enters separation step 32 is the phase from the extraction operation which contains the aromatic constituents and accordingly the hydrocarbon removed through line 34 is the aromatic hydrocarbon product of the process.

When operating our system on a 50–50 normal heptane-toluene feed stock with liquid sulfur dioxide as a solvent and modified by the use of a paraffinic stripping oil of the nature of an SAE 10 straight run distillate lubricating oil, we operate extraction column 21 with a sulfur dioxide to stripping oil ratio of 18:1. In extraction column 22 sufficient stripping oil is added thereto to lower the ratio of sulfur dioxide to stripping oil to a value of about 3.85:1. Sufficient liquid sulfur dioxide is added to the charge material introduced into the settler 23 so that the ratio of sulfur dioxide to stripping oil entering this vessel is about 1.48. Under these conditions, two liquid phases are also formed as above described. The temperature of the operational steps carried out in extractors 21 and 22 and in settler 23 is maintained at 30° F. The aromatic hydrocarbon product removed through line 34 is substantially pure toluene with a yield of 83.4 weight per cent.

Make-up liquid sulfur dioxide as needed is introduced into the system through a line 40 from a source not shown, while stripping oil as needed for make-up purposes is introduced into the system through a line 37 from a source, also not shown.

As considered throughout this specification and claims the stripping oil-rich raffinate phase removed through line 3 is considered the first raffinate phase of the operation. The material removed through line 5 is considered the first extract phase of the operation. The upper liquid phase accumulating in settler 23 and removed through the line 11 is considered the third raffinate phase. The bottoms phase from settler 23 and removed through line 6 is considered the third extract phase. In extractor 22, since the extract phase from line 5 and extractor 21 and the above-mentioned third extract phase from line 6 constitutes the charge stock, the material which is removed from this extractor 22 at the bottom and through line 12 is considered the second raffinate phase of the process, even though this material is the aromatic containing stream from which the aromatic hydrocarbon product of the process is recovered. In vessel 22, since some of the stripping oil from line 9 reaches the top of the vessel in a separate relatively light phase containing some extracted hydrocarbons, this material removed through line 8 is termed the second extract phase.

Summing up the operation of the apparatus of Figure 1, in vessel 21 the aromatic hydrocarbon is intended to be removed from the charge stock with the sulfur dioxide, while in extractor 22 sufficient stripping oil is added to extract from the feed material from line 7, all or substantially all but the aromatic hydrocarbon, so that material passing through line 12 will be free from non-aromatic hydrocarbons. In this operation, material passing through line 8 will, of course, contain the non-aromatic material, but will also contain appreciable quantities of aromatic hydrocarbons and, accordingly, this material is admixed with additional sulfur dioxide from line 10 and in settler 23 this additional liquid sulfur dioxide is intended to assist in the separation of all, or substantially all of this aromatic hydrocarbon in the sulfur dioxide rich phase 25 which is removed by way of line 6 for recycling through line 7 into extractor 22. In this manner, a substantially pure aromatic hydrocarbon is recovered from the stream flowing through line 12 while the loss of aromatic hydrocarbon in the material flowing through line 3 from vessel 21 is held at a minimum. Thus, in this particular operation the recovery of aromatic hydrocarbons from separation step 32 and passing through line 34 is 83.4 weight per cent of the aromatic hydrocarbon in the feed stock. The remainder of the aromatic hydrocarbon amounting to 16.6 per cent by weight is removed from the system in the non-aromatic product removed through line 30.

To summarize further the operation of our invention according to the apparatus of Figure 1, the following data is given hereinbelow:

*Summary of operation using the flow diagram of Figure 1*

The following data is based on 100 parts by weight of toluene-normal heptane feed stock containing 50 weight per cent of each constituent:

EXTRACTOR 21

[Parts by weight]

| Stream No. | 14 | 15 | 3 | 17 | 5 |
|---|---|---|---|---|---|
| SO₂ | 0 | 714 | 10.6 | 0 | 703.4 |
| Toluene | 50 | 0 | 3.4 | 0 | 46.6 |
| N-Heptane | 50 | 0 | 31.0 | 0 | 19.0 |
| Stripping Oil | 0 | 0 | 29.1 | 39.6 | 10.5 |

SO₂: Stripping oil = 714:39.6 = 18:1.

EXTRACTOR 22

| Stream No. | 7 | 8 | 9 | 12 |
|---|---|---|---|---|
| SO₂ | 928.7 | 60 | 0 | 868.7 |
| Toluene | 53.7 | 12 | 0 | 41.7 |
| N-Heptane | 22.0 | 22 | 0 | 0 |
| Stripping Oil | 15.5 | 176 | 226 | 65.5 |

SO₂: Stripping oil = 928.7:241 = 3.85:1.

SETTLER 23

| Stream No. | 6 | 10 | 11 |
|---|---|---|---|
| SO₂ | 225.3 | 200 | 34.7 |
| Toluene | 7.1 | 0 | 4.9 |
| N-Heptane | 3.0 | 0 | 19.0 |
| Stripping Oil | 5.0 | 0 | 171.0 |

SO₂: Stripping oil = 260:176 = 1.48:1.

Circulation per 100 parts by weight of feed stock:
Sulfur dioxide = 914 parts by weight.
Stripping oil = 265.6 parts by weight.
Aromatic recovery = 83.4 weight per cent.

Referring now to Figure 2 of the drawing, this embodiment of our invention utilizes additional apparatus over that required for use according to the apparatus of Figure 1. In Figure 2, the charge hydrocarbon stock to be separated into aromatic and non-aromatic constituents is conducted through a line 61, from a source, not shown, and introduced into an extractor 51. Extractor 51 may be similar in all respects to extractor 21 of Figure 1. The raffinate phase removed from extractor 51 through a line 62 is passed on through a line 93 into a separation step or zone 55 for separation into the hydrocarbon, sulfur dioxide and stripping oil. The extract phase removed from the bottom of the extractor 51 through a line 64 is passed into a still 65 in which sulfur dioxide and hydrocarbons are recovered from the stripping oil. The stripping oil is removed from the still 65 through a line 67 and is passed on through lines 74 and 88 into a stripping oil accumulation or run tank 75. The sulfur dioxide and hydrocarbon separated from the stripping oil in still 65 is withdrawn through a line 66 and is passed through a line 76 into the top of a secondary extractor 52. This secondary extractor 52 is equivalent of the extractor 22 of Figure 1. Stripping oil for use in the secondary extractor 52 enters through a line 92 and the stripping oil rich phase containing non-aromatic and some aromatic hydrocarbons is removed through a line 71 and passed into a still 69. In this still 69, stripping oil is removed as bottoms through a line 73 and is passed on through lines 74 and 88 into the run tank 75. In still 69 sulfur dioxide and hydrocarbons are removed overhead through a line 70 and these materials are passed on through a line 90 into the top of a third extractor 53. Additional liquid sulfur dioxide from an accumulator tank 96 is passed through a line 97 and is added to the material from line 70 and the mixture is introduced into the third extractor 53 as charge stock. Stripping oil as a stripping agent or an extractant is introduced into the bottom of the third extractor 53 through a line 91. Raffinate material is removed through a line 89 and is combined with raffinate material flowing through line 62 and the mixture is passed on through the line 93 into the separation step 55. Since the raffinate material from line 62 and that from line 89 constitutes the non-aromatic constituents, the hydrocarbon material removed from separation step 55 through a line 95 is the non-aromatic hydrocarbon product of the process. From this separation step sulfur dioxide is recovered and passed through a line 94 into the sulfur dioxide run tank 96, while recovered stripping oil is passed through lines 87 and 88 into the stripping oil run tank 75.

The bottoms material removed from extractor 52 in a line 77 is the aromatic hydrocarbon containing stream from which the aromatic hydrocarbon product of the process is separated. This material from line 77 is introduced into a separation step 54 which is more or less similar to the separation step 55. However, in the separation step 54, the aromatic hydrocarbon is separated and passed through a line 79 as the main product of the process, while sulfur dioxide recovered is passed through a line 80 into the sulfur dioxide run tank 96 and stripping oil is passed through lines 78 and 88 into the stripping oil run tank 75. The sulfur dioxide introduced into the primary extractor 51 may be passed from run tank 96 through lines 97 and 63 as shown, or the line 63 may be attached to the hydrocarbon feed line 61 so that the extractant and the charge stock can be mixed at least to some extent prior to introduction into the extractor. Stills 65, 69 and 82 are provided with reboiler coils 68, 72 and 85, respectively. Such reflux as might be needed for the operation of these stills may be provided by conventional means, and not shown in the drawing nor further described for purposes of simplicity.

The bottoms material from extractor 53 which contains largely sulfur dioxide and some aromatic hydrocarbons and stripping oil is passed through a line 84 into the still 82 in which the stripping oil is separated and withdrawn through a line 86. This stripping oil passes on through lines 87 and 88 into the stripping oil run tank 75. Hydrocarbon and sulfur dioxide separated in still 82 is removed therefrom through a line 83 and is added to the hydrocarbon and sulfur dioxide material from line 66 and the combined materials are passed on through a line 76 into the secondary extractor 52.

A line 81 connected with the bottom of the stripping oil run tank 75 is for withdrawal of stripping oil from this tank for addition to the several extractors of the process. A line 98 attached to the tank 75 is for addition of make up stripping oil as needed. A line 99 attached to the sulfur dioxide run tank 96 is provided for addition of make up sulfur dioxide as needed.

This apparatus of Figure 2 achieves substantially the same results as the apparatus of Figure 1, but with the use of stills for the separation of stripping oil from the several intermediate streams of the process it is possible to control the sulfur dioxide to stripping oil ratios more accurately. Extractors 51 and 52 of Figure 2 are operated under the same conditions as extractors 21 and 22 of Figure 1. Extractor 53 is intended to replace the separator or settler tank 23 of Figure 1. By the use of an extractor such as extractor 53, a more efficient separation is obtained than when using merely a phase separator. In extractors 51 and 52, when operating on a charge stock containing a 50 weight per cent normal heptane and 50 weight per cent toluene the same sulfur dioxide to stripping oil ratios may be used and the several streams may be introduced into extractor 53 to provide the same ratio of sulfur dioxide to stripping oil in extractor 53 as is carried in the settler 23 of Figure 1. In this manner, the apparatus of Figure 2 performs substantially the same operation as the apparatus of Figure 1.

In the embodiment of Figure 2, with the separation of stripping oil and solvent from intermediate raffinate and/or extract streams, it is possible to control very accurately the sulfur dioxide to stripping oil ratio at any and all stages of the process. By so controlling the solvent to stripping oil ratios it is possible to increase the yield of aromatic hydrocarbon product from such complex feed stocks as cracked gasolines at maximum purity.

When employing our process to separate and to recover aromatic hydrocarbons from, for example, a cracked gasoline which contains, along with aromatic hydrocarbons, paraffin naphthene and olefin hydrocarbons, the paraffin and naphthene hydrocarbons are removed with the stripping oil while the olefins are usually distributed between the aromatic and non-aromatic products. This distribution, at least in part, may be explained by stating that the higher molecular weight olefins tend to be included in the non-aromatic product while the lower molecular weight olefins tend to be included with the highly aromatic product.

While we have described our invention as applied to the separation of toluene from normal heptane, our process may be applied equally well to the separation and recovery of aromatic hydrocarbons from such charge stocks as cracked gasolines or other process streams available in manufacturing plants processing such hydrocarbon materials.

Condensers for use with overhead vapors from stills have not been shown in the embodiments of Figures 1 and 2 but the need, installation and operation of such auxiliary equipment are understood by those skilled in the art.

While certain embodiments of our invention have been described for illustrative purposes, the invention obviously is not limited thereto.

We claim:

1. A method for the separation and recovery of aromatic hydrocarbons from a hydrocarbon feed stock containing aromatic and non-aromatic hydrocarbons comprising solvent extracting in a first extraction operation said feed stock with liquefied sulfur dioxide in the presence of a quantity of a paraffinic hydrocarbon material boiling at a temperature above the end boiling point of said feed stock, from this operation separating a first extract phase and a first raffinate phase, solvent extracting in a second extraction operation said first extract phase with an additional quantity of said paraffinic hydrocarbon material, and from this second operation separating a second raffinate phase comprising said aromatic hydrocarbons and a second extract phase comprising said non-aromatic hydrocarbons, recovering aromatic hydrocarbons from the second raffinate phase as a main product of the process, treating in a third operation only said second extract phase with an additional quantity of liquid sulfur dioxide and from this third operation separating a heavy liquid phase from a light phase, introducing said heavy phase into said second operation with said first extract phase, combining said light phase with said first raffinate phase and recovering non-aromatic hydrocarbons from the combined phases as a second product of the process.

2. In the method of claim 1, additionally recovering paraffinic hydrocarbon material boiling at a temperature above said end boiling point from the combined specifically light phase and the first raffinate phase and recycling same into said first and second extraction operations as said first and second quantities of said paraffinic hydrocarbon material boiling at a temperature above said end boiling point.

3. In the method of claim 2 additionally recovering paraffinic hydrocarbon boiling above said end boiling point from said second raffinate phase and recycling same into said first and second extraction operations as a portion of said first and second quantities of said paraffinic hydrocarbon material boiling at a temperature above said end boiling point.

4. A method for the separating and recovery of aromatic hydrocarbon from a hydrocarbon feed stock containing aromatic and non-aromatic hydrocarbons comprising solvent extracting in a first extraction operation said feed stock with a first quantity of liquid sulfur dioxide in the presence of a first quantity of a paraffinic hydrocarbon material boiling at a temperature above the end boiling point of said feed stock, from this operation separating a first extract phase and a first raffinate phase, solvent extracting in a second operation said first extract phase with a second quantity of said paraffinic hydrocarbon material, from this second operation separating a second raffinate phase and a second extract phase, recovering aromatic hydrocarbons from said second raffinate phase as a main product of the process, solvent extracting in a third extraction operation only said second extract phase with an additional quantity of liquid sulfur dioxide and from this third extraction operation separating a third raffinate phase and a third extract phase, combining this third extract phase with said first extract phase prior to said second operation, combining said third and first raffinate phases and from these combined raffinate phases recovering non-aromatic feed stock hydrocarbons as a second product of the process.

5. In the method of claim 4, additionally recovering paraffinic hydrocarbon material boiling at a temperature above said end boiling point from the combined first and third raffinate phases and recycling same into said first and second extraction operations as said first and second quantities of said paraffinic hydrocarbon material boiling at a temperature above said end boiling point.

6. In the method of claim 5 additionally recovering paraffinic hydrocarbon boiling above said end boiling point from said second raffinate phase and recycling same into said first and second extraction operations as a portion of said first and second quantities of said paraffinic hydrocarbon material boiling at a temperature above said end boiling point.

7. The process of claim 3 wherein the feed stock is a cracked gasoline.

8. The method of claim 1 wherein the paraffinic hydrocarbon material boiling above the end boiling point of said feed stock is a low viscosity lubricating oil fraction.

9. The method of claim 1 wherein the paraffinic hydrocarbon material boiling above the end boiling point of said feed stock is a naphthenic hydrocarbon gas oil stock.

10. The method of claim 1 wherein the paraffinic hydrocarbon material boiling above the end boiling point of said feed stock is a straight run kerosene oil.

11. The method of claim 4 wherein the paraffinic hydrocarbon material boiling above the end boiling point of said feed stock is a low viscosity lubricating oil fraction.

12. The method of claim 4 wherein the paraffinic hydrocarbon material boiling above the end boiling point of said feed stock is a naphthenic hydrocarbon gas oil stock.

13. The method of claim 4 wherein the paraffinic hydrocarbon material boiling above the end boiling point of said feed stock is a straight run kerosene oil.

14. The process of claim 1 wherein the feed stock comprises a cracked gasoline.

15. The process of claim 4 wherein the feed stock comprises a cracked gasoline.

16. The process of claim 1 wherein the feed stock comprises n-heptane and toluene.

17. The process of claim 4 wherein the feed stock comprises n-heptane and toluene.

18. A method for the separation and recovery of aromatic hydrocarbons from a hydrocarbon feed stock containing aromatic and non-aromatic hydrocarbons comprising solvent extracting in a first extraction operation said feed stock with liquefied sulfur dioxide in the presence of a quantity of a paraffinic hydrocarbon material boiling at a temperature above the end boiling point of said feed stock, from this operation separating a first extract phase and a first raffinate phase, solvent extracting in a second extraction operation said first extract phase with liquid sulfur dioxide and said paraffinic hydrocarbon material at a greater paraffinic hydrocarbon material to liquid sulfur dioxide ratio than used in the first extraction operation by adding to the second operation an additional quantity of said paraffinic hydrocarbon material, and from this second operation separating a second raffinate phase comprising said aromatic hydrocarbons and a second extract phase comprising said non-aromatic hydrocarbons, recovering said aromatic hydrocarbons from the second raffinate phase as a main product of the process, treating in a third operation said second extract phase with a smaller volume of liquid sulfur dioxide and said paraffinic hydrocarbon material than used in said second operation at a still higher paraffinic hydrocarbon material to liquid sulfur dioxide ratio by adding to the third operation an additional quantity of liquid sulfur dioxide and a further quantity of said paraffinic hydrocarbon material and from this third operation separating a heavy liquid phase from a light phase, introducing said heavy phase into said second operation with said first extract phase, combining said light phase with said first raffinate phase and recovering non-aromatic hydrocarbons from the combined phases as a second product of the process.

19. In the method of claim 18, additionally recovering paraffinic hydrocarbon material boiling at a temperature above said end boiling point from the combined specifically light phase and the first raffinate phase and recycling same into said first and second extraction operations as said first and second quantities of said paraffinic hydrocarbon material boiling at a temperature above said end boiling point.

20. In the method of claim 19 additionally recovering paraffinic hydrocarbon boiling above said end boiling point from said second raffinate phase and recycling same into said first and second extraction operations as a portion of said first and second quantities of said paraffinic hydrocarbon material boiling at a temperature above said boiling point.

(References on following page)

References Cited in the file of this patent

UNITED STATES PATENTS

| | | |
|---|---|---|
| 1,912,349 | Tuttle | May 30, 1933 |
| 2,026,729 | Bray et al. | Jan. 7, 1936 |
| 2,091,078 | McKittrick et al. | Aug. 24, 1937 |
| 2,100,429 | Bray | Nov. 30, 1937 |
| 2,114,524 | Egli | Apr. 19, 1938 |
| 2,346,639 | Andrews et al. | Apr. 18, 1944 |
| 2,410,166 | Kimball | Oct. 29, 1946 |
| 2,412,828 | Naragon | Dec. 17, 1946 |

FOREIGN PATENTS

| | | |
|---|---|---|
| 441,104 | Great Britain | Jan. 13, 1936 |